United States Patent
Lerner et al.

(10) Patent No.: US 6,665,352 B2
(45) Date of Patent: Dec. 16, 2003

(54) OVERLAPPING WINDOWING MECHANISM UTILIZING TRANSMIT WAVEFORM EXTENSIONS

(75) Inventors: Gregory Lerner, Beer Sheva (IL); Dan Raphaeli, Kfar Saba (IL); Oren Kaufman, Beer Sheva (IL); Boris Zarud, Beer Sheva (IL)

(73) Assignee: Itran Communications Ltd., Beersheva (IL)

( * ) Notice: Subject to any disclaimer, the term of this patent is extended or adjusted under 35 U.S.C. 154(b) by 0 days.

(21) Appl. No.: 10/035,133

(22) Filed: Jan. 4, 2002

(65) Prior Publication Data

US 2003/0133495 A1 Jul. 17, 2003

(51) Int. Cl.⁷ .............................................. H04L 25/49
(52) U.S. Cl. ....................................... 375/296; 375/146
(58) Field of Search ................................ 375/296, 285, 375/140, 146; 714/701, 758

(56) References Cited

U.S. PATENT DOCUMENTS 6,038,450 A  *  3/2000  Brink et al. ................. 455/442
6,064,695 A     5/2000  Raphaeli ..................... 375/230
6,175,551 B1 *  1/2001  Awater et al. ............... 370/210
6,240,129 B1 *  5/2001  Reusens et al. ............. 375/222
6,373,901 B1    4/2002  O'Dea et al. ................ 375/296

* cited by examiner

*Primary Examiner*—Stephen Chin
*Assistant Examiner*—Kevin Kim
(74) *Attorney, Agent, or Firm*—Howard Zaretsky; Zaretsky & Associates PC (57) ABSTRACT

A novel and useful windowing mechanism for reducing the out of band harmonics of an output transmit signal. The windowing mechanism functions to smooth the transition between two consecutive transmit waveforms. The mechanism of present invention is particularly useful in communication systems characterized by consecutively transmitted symbols whereby the concatenation of transmitted waveforms causes discontinuities between symbols. The windowing mechanism is operative to reduce the effect of these discontinuities to reduce out of band harmonics of the transmitted output signal. The windowing mechanism extends each transmit waveform both earlier and later in time thus creating extending waveform portions on either end of the transmit waveform. The extended portions are then multiplied by a suitable windowing function and the result is summed with the next transmit waveform.

53 Claims, 6 Drawing Sheets

OVERLAPPING WINDOWING MECHANISM UTILIZING TRANSMIT WAVEFORM EXTENSIONS

FIELD OF THE INVENTION

The present invention relates generally to data communication systems and more particularly relates to an overlapping windowing mechanism for smoothing the transition between two consecutive transmit waveform signals in a communications transmitter.

BACKGROUND OF THE INVENTION

The use of spread spectrum communications techniques to improve the reliability and security of communications is well known and is becoming increasingly common. Spread spectrum communications transmits data utilizing a spectrum bandwidth that is much greater than the bandwidth of the data to be transmitted. This provides for more reliable communication in the presence of high narrowband noise, spectral distortion and pulse noise, in addition to other advantages. Spread spectrum communication systems typically utilize correlation techniques to identify an incoming received signal.

Figure 1:
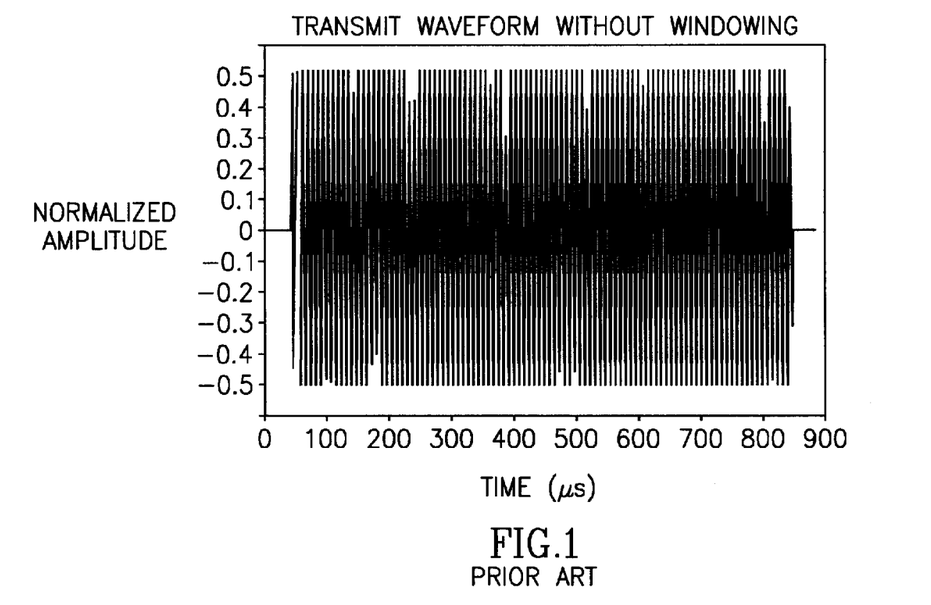
FIG. 1 is a plot of a transmit waveform pulse shown without windowing applied.

Spread spectrum communication systems modulate a spreading waveform that is then transmitted onto the channel. Commonly used spreading waveforms may include a chirp signal or a pseudo noise (PN) sequence. A plot of an example PN sequence type spreading waveform is shown in FIG. 1. The pulse shown is adapted for use in the frequency range of 120 to 400 kHz for use in the United States. The pulse serves as the transmit waveform that is modulated by the transmitter in accordance with the data to be transmitted. Each symbol is transmitted as a pulse that is modulated in accordance with the data.

In order to meet limitations on spectral bandwidth imposed by government bodies, the transmit waveform must meet certain criteria. In the United States, for example, the Federal Communications Commission (FCC) Standard, in Part 15, Section 107 on Conducted limits, specifies for equipment designed to be connected to the public utility (AC) power line, the RE voltage conducted back onto the AC power line for carrier current systems containing their fundamental emission within the frequency band 535–1705 kHz, the limit on conducted emissions is 1000 $\mu$V within the frequency band 535–1705 kHz. This corresponds to an attenuation of 60 dB.

Although each individual transmit waveform may be constructed to meet any such criteria, a problem arises when transmit waveforms are concatenated consecutively into a pulse sequence.

For example, in the case of code shift keying (CSK) modulation, the spreading waveform is circularly shifted in accordance with the data to be transmitted. Discontinuities are created at the point of intersection between two consecutive symbols (i.e. transmit waveforms) which create higher than permitted levels of harmonics in the transmitted signal.

Figure 2:
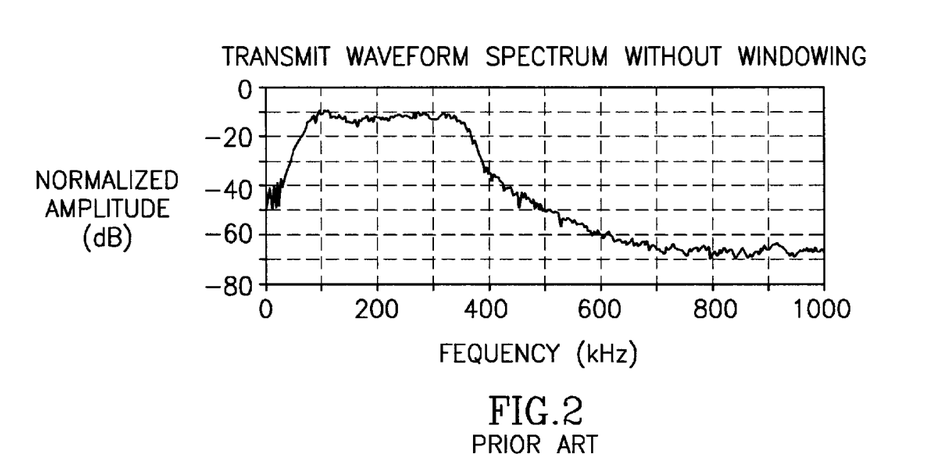
FIG. 2 is a spectrum plot of a sequence of transmit waveform pulses of FIG. 1.

The spectrum plot of a transmit signal comprising a sequence of transmit waveforms is shown in FIG. 2. A product using such a transmit waveform to communicate would not be able to meet FCC Part 15 standards for limitations on out of band harmonics.

There is thus a need for a mechanism to reduce the effect of discontinuities between consecutive transmitted symbols, to reduce out of band harmonics of the transmitted output signal.

SUMMARY OF THE INVENTION

Accordingly, the present invention is a novel and useful windowing mechanism for reducing the out of band harmonics of an output transmit signal. The windowing mechanism functions to smooth the transition between two consecutive transmit waveforms. The windowing mechanism of the present invention is operative to reduce the effect of discontinuities to reduce out of band harmonics of the transmitted output signal.

The mechanism of the present invention is useful in communication systems characterized by consecutively transmitted symbols whereby the concatenation of transmitted waveforms causes discontinuities between symbols. The mechanism is particularly useful in spread spectrum communication systems that operate in constrained bandwidth environments such as power line carrier, ISM frequency bands (e.g., 900 MHz, 2.4 GHz, etc.) or any other narrowband environments.

The windowing mechanism is operative to extend each transmit waveform both earlier and later in time thus creating extending waveform portions on either end of the transmit waveform. The extended portions are then multiplied by a suitable windowing function and the result is summed with the previous and next transmit waveforms.

The windowing function was developed in light of the following design goals and tradeoffs. The windowing function was designed to have low computational complexity but with high spectral efficiency wherein the number of multiplications required is reduced to a minimum. In addition, the windowing function has a short time response (i.e. overlap zones) since ISI intersymbol interference (ISI) is introduced in the overlap zones which degrades the overall performance of a modem that incorporates the invention. Further, the windowing function is a constant envelope window which is important for optimal exploitation of the output amplifier since it allows the use of rail-to-rail designed input symbols with the amplifier.

The start of the transmit waveform is extended earlier in time to generate a first overlapping or extended portion while the end of the transmit waveform is also extended later in time to generate a second extended portion. Similarly, the end of the previous transmit waveform is extended to create an extended portion and the start of the next transmit waveform is also extended to create an extended portion.

Once the extended portions are generated, a windowing function is applied to the transmit waveforms. The windowing function is applied not only to the extended portions but also to equivalent length start and end portions of the transmit waveform itself. The windowing function is also applied to the previous and next transmit waveforms as well. The current transmit waveform is multiplied by the amplitude of the windowing function.

Each extended transmit waveform is multiplied by the windowing function. The windowed extended transmit waveforms are overlapped and summed to generate a windowed transmit signal. Thus, the windowing process, causes each transmit waveform to be included somewhat in the previous and next transmit waveforms. The windowing function may comprise any suitable function, such as a linear or non-linear function.

The present invention has applications in systems where it is desired to reduce the out of band harmonics of a transmit signal in order to conform to government imposed regulations on out of band attenuation, an example of which is the FCC Standard, Part 15, Section 107 on Conducted limits which specifies, for equipment designed to be connected to the public utility (AC) power line, a limit of 1000 μV within the frequency band 535–1705 kHz for carrier current systems containing their fundamental emission within the frequency band 535–1705 kHz for the RF emissions conducted back onto the AC power line, corresponding to an attenuation of 60 dB.

Many aspects of the invention may be constructed as software objects that execute in embedded devices as firmware, software objects that execute us part of a software application on a computer system running an operating system suck as Windows, UNIX, LINUX, etc., an Application Specific Integrated Circuit (ASIC) or functionally equivalent discrete hardware components.

There is therefore provided in accordance with the invention a method of windowing a sequence of symbols, the method comprising the steps of appending zero or more signal continuations to a current symbol so as to generate an augmented symbol and multiplying zero or more portions of the augmented symbol with a window.

There is also provided in accordance with the invention a method of windowing a sequence of transmit waveforms, each transmit waveform having a first end and a second end, the method comprising the steps of continuing the second end of a previous transmit waveform later in time to generate a second continued portion, continuing the first end of a next transmit waveform earlier in time to generate a first continued portion, wherein the next transmit waveform is consecutively later in time from the previous transmit waveform, multiplying the first continued portion, the second continued portion and a current transmit waveform by a windowing function to generate a weighted first continued portion, a weighted second continued portion and a weighted current transmit waveform, respectively and summing the first weighted continued portion, the second weighted portion and the weighted current transmit waveform to generate an augmented current transmit waveform.

There is further provided in accordance with the invention a method of windowing a sequence of transmit waveforms, each transmit waveform having a first end and a second end, the method comprising the steps of extending the first end of a current waveform earlier in time by cyclically shifting right the transmit waveform to generate a first extended portion, extending the second end of the current waveform later in time by cyclically shifting left the transmit waveform to generate a second extended portion, extending the second end of a previous transmit waveform later in time by cyclically shifting left the previous transmit waveform to generate a third extended portion, extending the first end of a next transmit waveform earlier in time by cyclically shifting right the next transmit waveform to generate a fourth extended portion, multiplying the first extended portion, the second extended portion, the third extended portion and the fourth extended portion by a windowing function so as to generate a first windowed portion, second windowed portion, third windowed portion and fourth windowed portion, respectively and adding the first windowed portion to the second end of the previous transmit waveform, the second windowed portion to the first end of the next transmit waveform, the third windowed portion to the first end of the current transmit waveform and the fourth windowed portion the second end of the current transmit waveform.

There is also provided in accordance with the invention a method of windowing a sequence of transmit waveforms, the method comprising the steps of extending each transmit waveform both earlier and later in time, applying a windowing function to both extended portions of each transmit waveform and overlapping and summing the extended portions of a current transmit waveform with the previous transmit waveform and next waveform.

There is further provided in accordance with the invention an Application Specific Integrated Circuit (ASIC) for use in a communications node for windowing a transmit waveform sequence, each transmit waveform having a first end and second end later in time from the first end comprising means for generating a second continued portion by cyclically continuing later in time the second end of a previous transmit waveform, means for generating a first continued portion by cyclically continuing earlier in time the first end of a next transmit waveform, means for multiplying the first continued portion by the amplitude of a first windowing function to generate a weighted first continued portion and multiplying the second continued portion by the amplitude of a second windowing function to generate a weighted second continued portion and means for summing the first weighted continued portion with the second end of the previous transmit waveform and the second weighted continued portion with the first end of the next transmit waveform.

There is also provided in accordance with the invention a transmitter for use in a communications system comprising an initial index calculator operative to generate an initial index in accordance with a shift index input from a host data source, a transmit waveform generator adapted to generate a sequence of transmit waveforms, each transmit waveform rotated by an amount in accordance with the initial index and having a length equal to the length of a modulation waveform signal, a windowing circuit adapted to receive the transmit waveform and to apply a windowing function thereto, the windowing circuit comprising means for generating a second continued portion by cyclically continuing later in time the second end of a previous transmit waveform, means for generating a first continued portion by cyclically continuing earlier in time the first end of a next transmit waveform, means for multiplying the first continued portion by the amplitude of a first windowing function to generate a weighted first continued portion and multiplying the second continued portion by the amplitude of a second windowing function to generate a weighted second continued portion, means for summing the first weighted continued portion with the second end of the previous transmit waveform and the second weighted continued portion with the first end of the next transmit waveform so as to generate a windowed transmit waveform, channel coupling circuitry operative to filter, amplify and couple the windowed waveform onto a channel media.

There is further provided in accordance with the invention a communications station for transmitting and receiving signals to and from other stations connected over a shared communications media based network comprising a coupling circuit for generating a receive signal received over the network and for outputting a transmit signal onto the network, a transmitter adapted to modulate data to be transmitted in accordance with a modulation scheme so as to generate a transmit waveform therefrom, the transmitter comprising a windowing circuit for applying a windowing function to the transmit waveform, the windowing circuit comprising means for generating a second continued portion by cyclically continuing later in time the second end of a previous transmit waveform, means for generating a first continued portion by cyclically continuing earlier in time the first end of a next transmit waveform, means for multiplying the first continued portion by the amplitude of a first windowing function to generate a weighted first continued portion and multiplying the second continued portion by the amplitude of a second windowing function to generate a weighted second continued portion, means for summing the first weighted continued portion with the second end of the previous transmit waveform and the second weighted continued portion with the first end of the next transmit waveform so as to generate a windowed transmit waveform, a receiver adapted to demodulate the receive signal in accordance with the modulation scheme so as to generate a receive data signal therefrom, a media access control (MAC) circuit adapted to interface an application processor to the shared communications media, the application processor adapted to control the operation of the transmitter, receiver and MAC and to provide an interface between the MAC and an external host.

There is also provided in accordance with the invention a computer program product for use in communications station, the computer program product comprising a computer useable medium having computer readable program code means embodied in the medium for applying a windowing function to a transmit waveform in a communications node, the computer program product comprising computer readable program code means for generating a second continued portion by cyclically continuing later in time the second end of a previous transmit waveform, computer readable program code means for generating a first continued portion by cyclically continuing earlier in time the first end of a next transmit waveform, computer readable program code means for multiplying the first continued portion by the amplitude of a first windowing function to generate a weighted first continued portion and multiplying the second continued portion by the amplitude of a second windowing function to generate a weighted second continued portion and computer readable program code means for summing the first weighted continued portion with the second end of the previous transmit waveform and the second weighted continued portion with the first end of the next transmit waveform.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ASIC | Application Specific Integrated Circuit |
| BPF | Band Pass Filter |
| CSK | Code Shift Keying |
| D/A | Digital to Analog |
| DC | Direct Current |
| DCSK | Differential Code Shift Keying |
| FCC | Federal Communications Commission |
| ISI | Intersymbol Interference |
| LAN | Local Area Network |
| MAC | Media Access Control |
| OSI | Open Systems Interconnect |
| PLC | Power Line Carrier |
| PN | Pseudo random Noise |
| RF | Radio Frequency |
| ROM | Read Only Memory |
| UST | Unit Symbol Time |
| WAN | Wide Area Network |

Detailed Description of the Invention

The present invention is a novel and useful windowing mechanism for reducing the out of band harmonics of an output transmit signal. The windowing mechanism functions to smooth the transition between two consecutive transmit waveforms. The mechanism of the present invention is particularly useful in communication systems characterized by consecutively transmitted symbols whereby the concatenation of transmitted waveforms causes discontinuities between symbols. The windowing mechanism of the present invention is operative to reduce the effect of these discontinuities to reduce out of band harmonics of the transmitted output signal.

Throughout this document, the term 'station,' 'node' or 'communication node' shall be taken to mean any network entity, implemented in either hardware, software or a combination of hardware and software, which may be the endpoint of a call, link or connection within a shared media based network. The network may comprise any type of shared network or media including but not limited to power line carrier based networks, twisted pair networks, IR wireless networks, RF wireless networks, optical fiber ring networks, etc.

The term 'call,' 'link' or 'connection' shall be taken to mean any communication path that is established between at least two nodes for the purpose of communication therebetween. The term phase unit is defined as a sample time in the receiver. A sample time is any suitable period that the signal or correlator output can be sampled without loosing information.

The term 'transmit waveform' shall be taken to mean the spreading waveform modulated to convey information in accordance with the data to be transmitted. For example, the spreading waveform may comprise a chirp or PN sequence circularly shifted in accordance with the data. The term 'symbol' is defined as a unit of information that is conveyed in a single transmit waveform. A symbol may represent one or more bits in accordance with the particular encoding and modulation implemented.

The windowing mechanism of the present invention is especially suited for use in a spread spectrum data communications system that utilizes the Differential Code Shift Keying (DCSK) or non-differential Code Shift Keying (CSK) modulation technique. Such communications systems are applicable to relatively noisy environments such as the AC power line. To aid in illustrating the principles of the present invention, the windowing mechanism is described in the context of a near baseband spread spectrum communication system utilizing CSK modulation. Note that the invention is not limited to this modulation, as one skilled in the art can apply the windowing mechanism described herein to other types of communication systems and other types of modulation as well.

In a CSK transmission system, the data is transmitted in the form of time shifts between consecutive circularly rotated waveforms of length T which are referred to as spreading waveforms, i.e., spread spectrum correlator sequence waveforms. The spreading waveforms can comprise any type of waveform that has suitable auto correlation properties. During each symbol period, referred to as a unit symbol time (UST), a plurality of bits are transmitted. The symbol period is divided into a plurality of shift indexes with each shift index representing a particular bit pattern. The information, i.e., bit pattern, is conveyed by rotating the spreading waveform by a certain amount corresponding to the data to be transmitted. The data is conveyed in the degree of rotation or circular shift applied to the spreading waveform before it is transmitted. Note that the spreading waveform may comprise any suitable waveform such as a chirp, pseudorandom sequence, etc.

In a CSK system, the data is conveyed in the absolute shift assigned to the spreading waveform. In a DCSK system, the data is conveyed in the shift differential between consecutive symbols. The windowing scheme of the present invention is applicable to both CSK and DCSK transmission systems.

Upon reception by the receiver, the signal is input to a matched filter having a template of the spreading waveform pattern to detect the amount of rotation (or circular shift) within the received signal for each symbol. The received data is fed into a cyclic correlator wherein the contents are periodically circularly shifted and a correlation output generated therefrom. Cyclic correlation may be achieved by inputting the received data to a shift register whose output is fed back to its input and circularly rotating, i.e., shifting, the contents of the shift register. The output of the shift register is input to a matched filter. For each bit shift or rotation, the matched filter generates a correlation sum. A shift index is determined for each UST corresponding to the shift index that yields the maximum (or minimum) correlation sum. Differential shift indexes are generated by subtracting the currently received shift index from the previously received shift index. The differential shift index is then decoded to yield the originally transmitted data.

Spread spectrum communications systems based on DCSK or CSK modulation are described in more detail in U.S. Pat. No. 6,064,695, to Raphaeli, entitled "Spread Spectrum Communication System Utilizing Differential Code Shift Keying," incorporated herein by reference in its entirety. Note, however, that one skilled in the communication arts may apply the techniques of the present invention to other modulation techniques as well.

Figure 3:
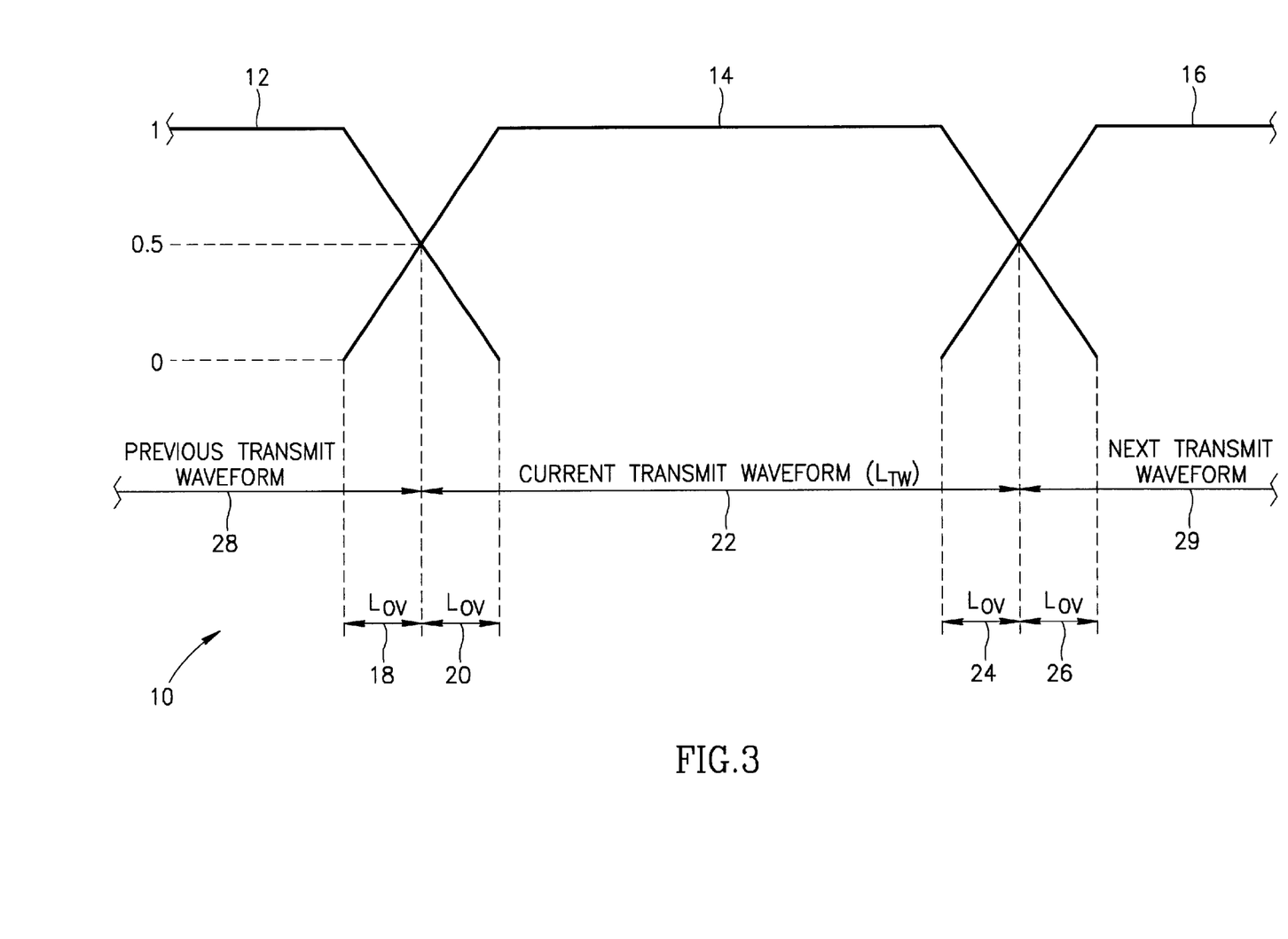
FIG. 3 is a diagram illustrating the windowing mechanism applied to a transmit waveform sequence in accordance with the present invention.

In accordance with the present invention, the windowing mechanism is operative to smooth (i.e. smear) the transition between two consecutive transmit waveforms so as to reduce the effects of any discontinuities between transmit waveforms. A diagram illustrating the windowing mechanism applied to a transmit waveform sequence in accordance with the present invention is shown in FIG. 3. Each transmit waveform is extended both earlier and later in time creating extended waveform portions on either end of the transmit waveform. The extended portions are then multiplied by a suitable windowing function and the result is summed with the previous and next transmit waveforms.

Consider a current transmit waveform 22 of length $L_{TW}$ that has a normal length of 800 µs. The start of the transmit waveform is extended earlier in time to generate an overlapping or extended portion 18 having a length $L_{OV}$. The end of the transmit waveform is also extended later in time to generate an extended portion 26 also having a length $L_{OV}$.

Similarly, the end of the previous transmit waveform 28 is extended to create an extended portion 20 having a length $L_{OV}$. The start of the next transmit waveform 29 is extended to create an extended portion 24 having a length $L_{OV}$. In the case of CSK modulation, the transmit waveform comprises a spreading waveform that is circularly shifted in accordance with the data to be transmitted.

The extended portions are generated by continuing to circularly shift the spreading waveform by a predetermined amount. For example, to generate extended portion 18, the current transmit waveform is circularly shifted to the right an amount equivalent to 25 µs. Similarly, to generate extended portion 26, the current transmit waveform is circularly shifted to the left an amount equivalent to 25 µs. For example, an extended buffer may be used to store the current transmit waveform with both starting and ending extended portions. For other types of spreading waveforms, the extended portion may be generated using other suitable means such as by copying portions of the non-extended transmit waveform.

Note that the length of the extended portions may be any suitable length. In the example presented herein, the extended portions $L_{OV}$ comprise approximately 3% of the normal length of the transmit waveform, i.e. 25 µs.

Note that the invention is not limited to any particular value for the extended portion $L_{OV}$. In general, the value of the extended portion is the result of a tradeoff between attempting to smooth the resultant transmit signal on the one hand and to reduce the effects of Intersymbol Interference (ISI) on the other hand. In a preferred approach, the extended portion is increased from zero until the desired spectrum is reached.

In the above example, this point was reached when the extended portion comprises approximately 3% of the transmit symbol. For other transmit signals, this point may be reached using extended portions larger or smaller than 3% of the normal length of the transmit waveform. For example, the extended portions for a transmit waveform suitable for use in European applications increases to approximately 12% of the normal length of the transmit waveform (e.g., 200 µts extended portion for a symbol of length 1600 µs.

Once the extended portions are generated, a windowing function 14 is applied. The windowing function is applied not only to the extended portions 18, 26 but also to equivalent length start and end portions 20, 24 of the transmit waveform itself. Windowing functions 12, 16 are applied to the previous and next transmit waveforms as well. The current transmit waveform is multiplied by the amplitude of the windowing function. Note that preferably, the windowing function is such that the weight applied to the current transmit waveform is stronger in the inner halves of the intersection point while it declines towards the outer halves of the intersection point.

Each extended transmit waveform is multiplied by the windowing function. The windowed extended transmit waveforms are overlapped and summed to generate a windowed transmit signal. Thus, the windowing process, causes each transmit waveform to be partially included in the previous and next transmit waveforms.

The windowing function may comprise any suitable function, such as a linear or non-linear function. A windowing function that yields a better spectrum than a standard trapezoid function is given as $$f(x) = ax - b \sin x \quad (1)$$

where x represents the sample point;

a and b are constants

The constants a and b may be determined empirically in accordance with the particular implementation.

A windowing function suitable for use with the spectrum shaping required by the example CSK based communication system described herein, has the following form:

$$W(t) = r(t+\tau) \text{ if } -\tau < t < 0 \quad (2)$$

1 if $0 < t < T - \tau$ $1 - r(t - T + \tau)$ if $T - \tau < t < T$ 0 otherwise where $$r(t) = \frac{t}{\tau} - 0.0575 \sin\left(\frac{2\pi t}{\tau}\right) \quad (3)$$

and wherein

τ is defined as the extended portion (identical to $L_{OV}$ described above);

T is the length of the current transmit waveform ($L_{TW}$);

t is the time variable;

r(t) is a function that defines the character of the window (any suitable function may be chosen for r(t) depending on the actual implementation);

An example windowing function r(t) suitable for use with the present invention is presented in Table 1. The function is presented in the form of 128 numerical samples, each sample being 9-bits long. Thus, the samples range between values of 0 and 511.

TABLE 1

Example window function sample values

| Sample | Value |
|---|---|
| 1 | 511 |
| 2 | 508 |
| 3 | 506 |
| 4 | 503 |
| 5 | 500 |
| 6 | 498 |
| 7 | 495 |
| 8 | 493 |
| 9 | 490 |
| 10 | 487 |
| 11 | 485 |
| 12 | 482 |
| 13 | 479 |
| 14 | 476 |
| 15 | 473 |
| 16 | 470 |
| 17 | 467 |

TABLE 1-continued

Example window function sample values

| Sample | Value |
|---|---|
| 18 | 464 |
| 19 | 461 |
| 20 | 458 |
| 21 | 455 |
| 22 | 452 |
| 23 | 448 |
| 24 | 445 |
| 25 | 441 |
| 26 | 438 |
| 27 | 434 |
| 28 | 431 |
| 29 | 427 |
| 30 | 423 |
| 31 | 419 |
| 32 | 415 |
| 33 | 411 |
| 34 | 407 |
| 35 | 403 |
| 36 | 399 |
| 37 | 395 |
| 38 | 390 |
| 39 | 386 |
| 40 | 381 |
| 41 | 377 |
| 42 | 372 |
| 43 | 368 |
| 44 | 363 |
| 45 | 358 |
| 46 | 353 |
| 47 | 348 |
| 48 | 343 |
| 49 | 338 |
| 50 | 333 |
| 51 | 328 |
| 52 | 323 |
| 53 | 318 |
| 54 | 313 |
| 55 | 307 |
| 56 | 302 |
| 57 | 297 |
| 58 | 291 |
| 59 | 286 |
| 60 | 280 |
| 61 | 275 |
| 62 | 270 |
| 63 | 264 |
| 64 | 259 |
| 65 | 253 |
| 66 | 248 |
| 67 | 242 |
| 68 | 237 |
| 69 | 232 |
| 70 | 226 |
| 71 | 221 |
| 72 | 215 |
| 73 | 210 |
| 74 | 205 |
| 75 | 199 |
| 76 | 194 |
| 77 | 189 |
| 78 | 184 |
| 79 | 179 |
| 80 | 174 |
| 81 | 169 |
| 82 | 164 |
| 83 | 159 |
| 84 | 154 |
| 85 | 149 |
| 86 | 144 |
| 87 | 140 |
| 88 | 135 |
| 89 | 131 |
| 90 | 126 |
| 91 | 122 |
| 92 | 117 |

TABLE 1-continued

Example window function sample values

| Sample | Value |
| --- | --- |
| 93 | 113 |
| 94 | 109 |
| 95 | 105 |
| 96 | 101 |
| 97 | 97 |
| 98 | 93 |
| 99 | 89 |
| 100 | 85 |
| 101 | 81 |
| 102 | 78 |
| 103 | 74 |
| 104 | 71 |
| 105 | 67 |
| 106 | 64 |
| 107 | 60 |
| 108 | 57 |
| 109 | 54 |
| 110 | 51 |
| 111 | 48 |
| 112 | 45 |
| 113 | 42 |
| 114 | 39 |
| 115 | 36 |
| 116 | 33 |
| 117 | 30 |
| 118 | 27 |
| 119 | 25 |
| 120 | 22 |
| 121 | 19 |
| 122 | 17 |
| 123 | 14 |
| 124 | 12 |
| 125 | 9 |
| 126 | 6 |
| 127 | 4 |
| 128 | 1 |

The windowing function of the present invention is applicable in many systems due to its advantageous characteristics described below. Firstly, the windowing function exhibits a constant amplitude envelope meaning that the sum of two windows consecutive in time is constant permitting optimal utilization of the dynamic range of the output amplifier. Secondly, the windowing function is optimized exhibiting high spectral shaping efficiency at low ISI. The windowing function is optimized in terms of the trade-off between time duration versus spectral roll-off. The tighter the resulting spectrum (i.e. the sharper the edge between the transition and stop bands), the larger the amount of ISI in the resultant signal. A tighter spectrum is achieved by lengthening the overlapping region between consecutive pulses. Thus, very flat spectral tables may be created in transmission.

Thirdly, the windowing function is realizable using well-known digital design techniques, having low computation requirements. A multiplication operation is only required in the transition (i.e. overlap) zones of the window. Fourthly, one skilled in the art may easily apply the windowing function described herein, to spectrum shaping in many other types of spread spectrum digital modulated symbols in substantially the same way. Fourthly, the windowing function described herein is especially well suited for use in spread spectrum modulations that are employed within systems that must operate within tight spectral regulations.

Figure 4:
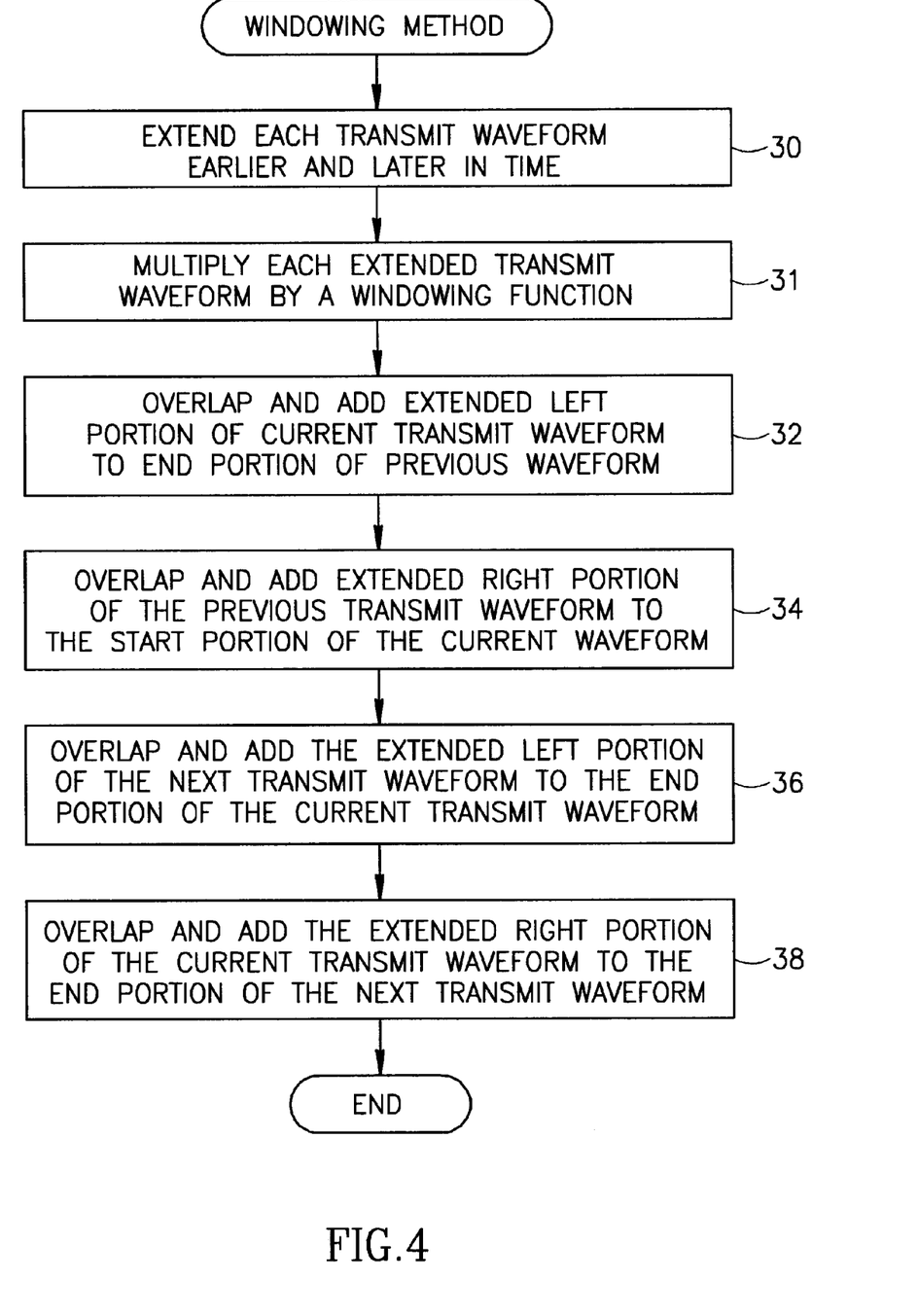
FIG. 4 is a flow diagram illustrating the windowing mechanism of the present invention.

A flow diagram illustrating the windowing mechanism of the present invention is shown in FIG. 4. First, each transmit waveform is extended both earlier and later in time to generate extended left (earlier) and right (later) portions (step 30). Each extended transmit waveform is then multiplied by a suitable windowing function (step 31). The extended left portion of the current transmit waveform is overlapped with and added to the end portion of the previous waveform (step 32). The extended right portion of the previous transmit waveform is overlapped with and added to the start portion of the current waveform (step 34).

Similarly, the extended left portion of the next transmit waveform is overlapped with and added to the end portion of the current waveform (step 36). The extended right portion of the current transmit waveform is overlapped with and added to the end portion of the next waveform (step 38).

Note that depending on the implementation, only current and next transmit waveforms are required to generate the windowed transmit signal. In this embodiment, at some point in the processing of the current transmit waveform, the next symbol becomes the current symbol without the requirement of storing the previous symbol.

In general, the windowing scheme of the present invention is operative to append a signal continuation to zero, one or both sides of a symbol to generate an augmented symbol. The contents of any signal continuation appended may comprise any suitable content in accordance with the particular implementation as long as it conforms with any frequency spectrum limitations imposed by the particular application or environment.

The augmented symbol is then multiplied by a window function. Note that in the general case the window function may not be one in any portion, thus no part of the symbol remains unmodified. In other cases, only the edges of the window function are smaller than one meaning that a portion of the symbol remains unmodified. It is important to note that the length of the edge of the window function is not necessarily equal to the length of the signal continuation. In fact in most cases the length of the edge of the window function is larger than the length of the signal continuation.

Note that in accordance with the invention, the windowing method may comprise a number of options. Several options include the following: (1) not to append any signal continuations and to multiply the current symbol alone with a window; (2) to append a signal continuation to one side of the current symbol and to multiply the signal continuation with a window and the end portion of the current symbol with a different window; (3) to append a signal continuation to both sides of the current symbol and to multiply the signal continuations alone with a window; and (4) to append a signal continuation to both sides of the current symbol and to multiply both the two signal continuations and the current symbol with a window.

Figure 5:
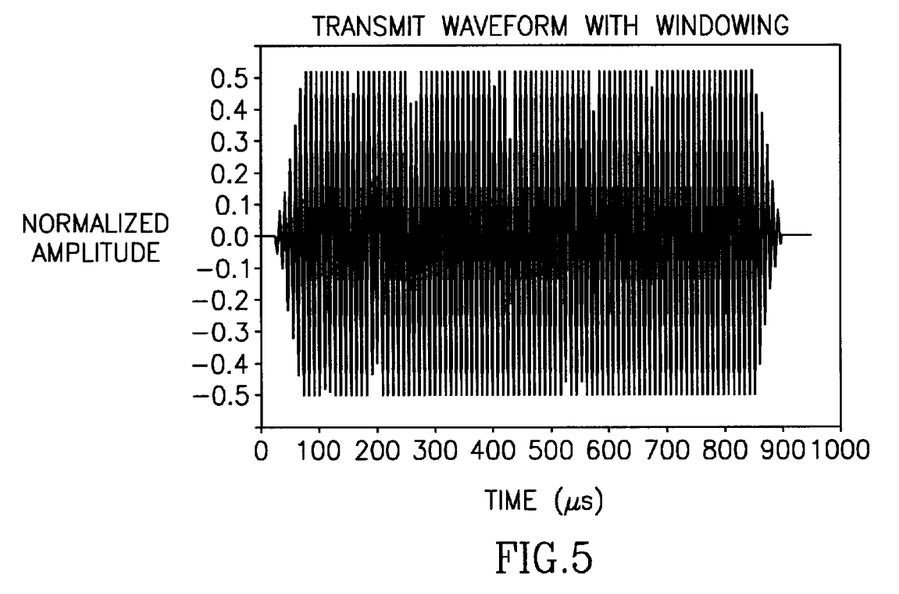
FIG. 5 is a plot of a transmit waveform pulse shown with windowing applied in accordance with the present invention.

An example of the application of the windowing mechanism of the present invention to the transmit waveform of FIG. 1, is shown in FIG. 5. The normalized amplitude is shown as a function of time. The waveform without windowing (FIG. 1) is characterized by sharp transitions at the start and end of the waveform. After windowing, the waveform is characterized by a smooth transition from DC to the full-scale value of the waveform. The windowing smoothes the transition between DC and the maximum amplitude of the waveform by applying the windowing function to the start and end portions of the waveform and combining those values with the neighboring windowed extended transmit waveform.

Figure 6:
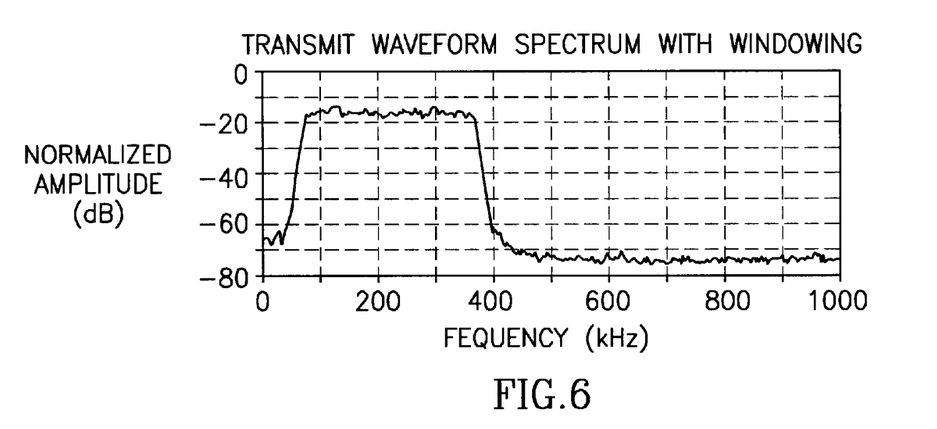
FIG. 6 is a spectrum plot of a sequence of transmit waveform pulses of FIG. 5 with windowing applied.

A spectrum plot of a sequence of the transmit waveform pulses of FIG. 5 with windowing applied is shown in FIG. 6. The spectrum, when compared to the spectrum of FIG. 2, is markedly improved with an attenuation of over 50 dB at 100 kHz representing an additional 25 dB over the non-windowed spectrum. Moreover, at 535 kHz, the attenuation is increased to over 65 dB, an improvement of almost 30 dB over the non-windowed spectrum.

Thus, the windowing mechanism of the present invention is effective to smooth the transition between two consecutive transmit waveforms to significantly reduce the effects of discontinuities between consecutive transmit waveforms. Smoothing the transitions causes a reduction in out of band harmonics permitting the transmit signal to conform to government proscribed limitations such as the FCC Part 15 standard in the example presented herein.

Figure 7:
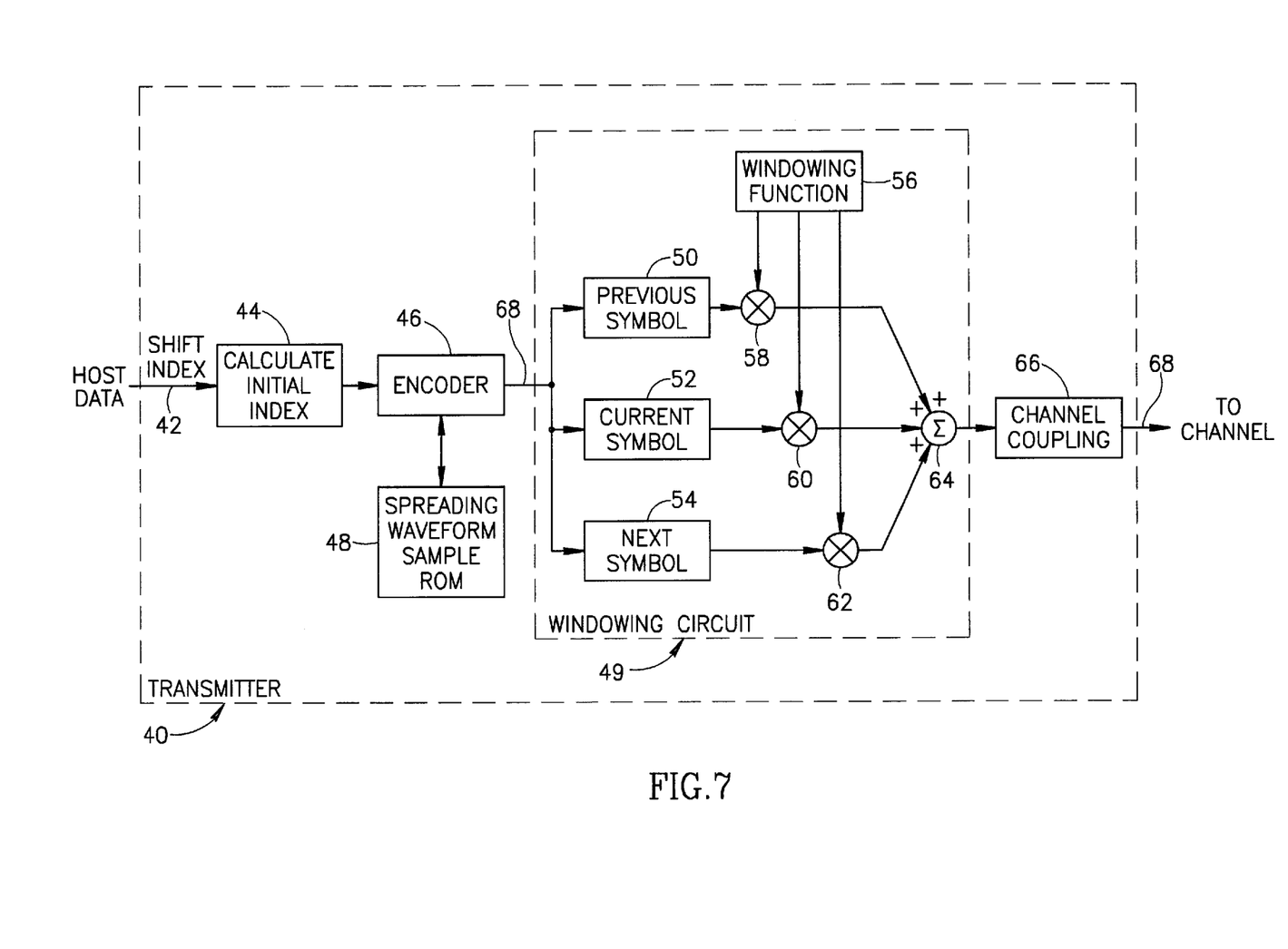
FIG. 7 is a block diagram illustrating an example transmitter adapted to implement the windowing mechanism of the present invention.

A block diagram illustrating an example transmitter adapted to implement the windowing mechanism of the present invention is shown in FIG. 7, the transmitter, generally referenced 40, is typically part of a modern transceiver located in each station in a network, such as a power line carrier based network. In the example provided, the modem transceiver is adapted to communicate using CSK modulation. Note that one skilled in the communication arts may apply the techniques of the present invention to other modulation techniques as well.

Data to be transmitted is provided by an external host and represents the shift index to be applied to the spreading waveform. The host data is input to the calculate initial index module 44 which functions to determine the amount of rotation to be applied to the spreading waveform. The amount of rotation is represented as a shift index. The initial index is input to the encoder 46 which functions to generate the transmit waveform in accordance with the shift index. Samples of the spreading waveform itself are stored in a spreading waveform sample ROM 48 which comprises the digitized representation of the spreading waveform. The spreading waveform is read out starting from an initial point corresponding to the shift index. Starting from the initial point, the entire spreading waveform is circularly read out and input to the window circuit 49.

The window circuit comprises one or more memory buffers 50, 52, 54 for storing the previous, current and next symbols, respectively. Portions of the contents of these buffers are multiplied by a windowing function 56 via multipliers 58, 60, 62 corresponding to previous, current and next buffers 50, 52, 54, respectively. The products of the multipliers are summed via summer 64 and represent the windowed transmit waveform.

The windowed transmit waveform in then input to the channel coupling circuit 66 which comprises the circuitry required to couple the signal onto the physical channel. In one embodiment, the coupling circuitry comprises a D/A converter whose analog output is first filtered by a band pass filter (BPF) having a suitable pass band in accordance with the signal width. The output of the BPF is then amplified by an output amplifier wherein the output of the amplifier comprises the transmit output signal 68 that is placed onto the channel.

Note that in an alternative embodiment, only the current and next buffers are required to generate the windowed transmit signal. In this embodiment, at some point in the processing of the current transmit waveform, the contents of the next symbol buffer are moved to the current symbol buffer and the process continues.

In particular, the end of the current symbol and beginning of the next symbol are first processed. When complete, the contents of the next symbol buffer is written into the current symbol buffer and the next symbol to be transmitted is stored in the next symbol buffer.

Station Incorporating the Windowing Mechanism

The windowing mechanism of the present invention may be incorporated in a communications transceiver such as a station, network node, modem, etc. One example application is in a digital modem adapted for communications over the power line media using a near baseband spread spectrum modulated signal which is coherently decoded. The modem utilizes a 120–400 kHz frequency band (for use in the United States) or 20–80 kHz and 95–125 kHz frequency band (for use in Europe). The modulation used is the so called CSK or DCSK modulation and in addition, the modem is capable of unicast, broadcast and multicast transmissions using the spread spectrum modulated signal in the appropriate band. The transmission protocol is packet oriented whereby each packet transmitted comprises some type of header including a synchronization sequence which permits the receiver to synchronize on the spreading waveform (e.g., chirp, PN sequence, etc.) followed by the packet data modulated as circularly shifted spreading waveforms. As described above, the synchronization sequence is processed through a linear correlator while the data is decoded using cyclic correlation.

Figure 8:
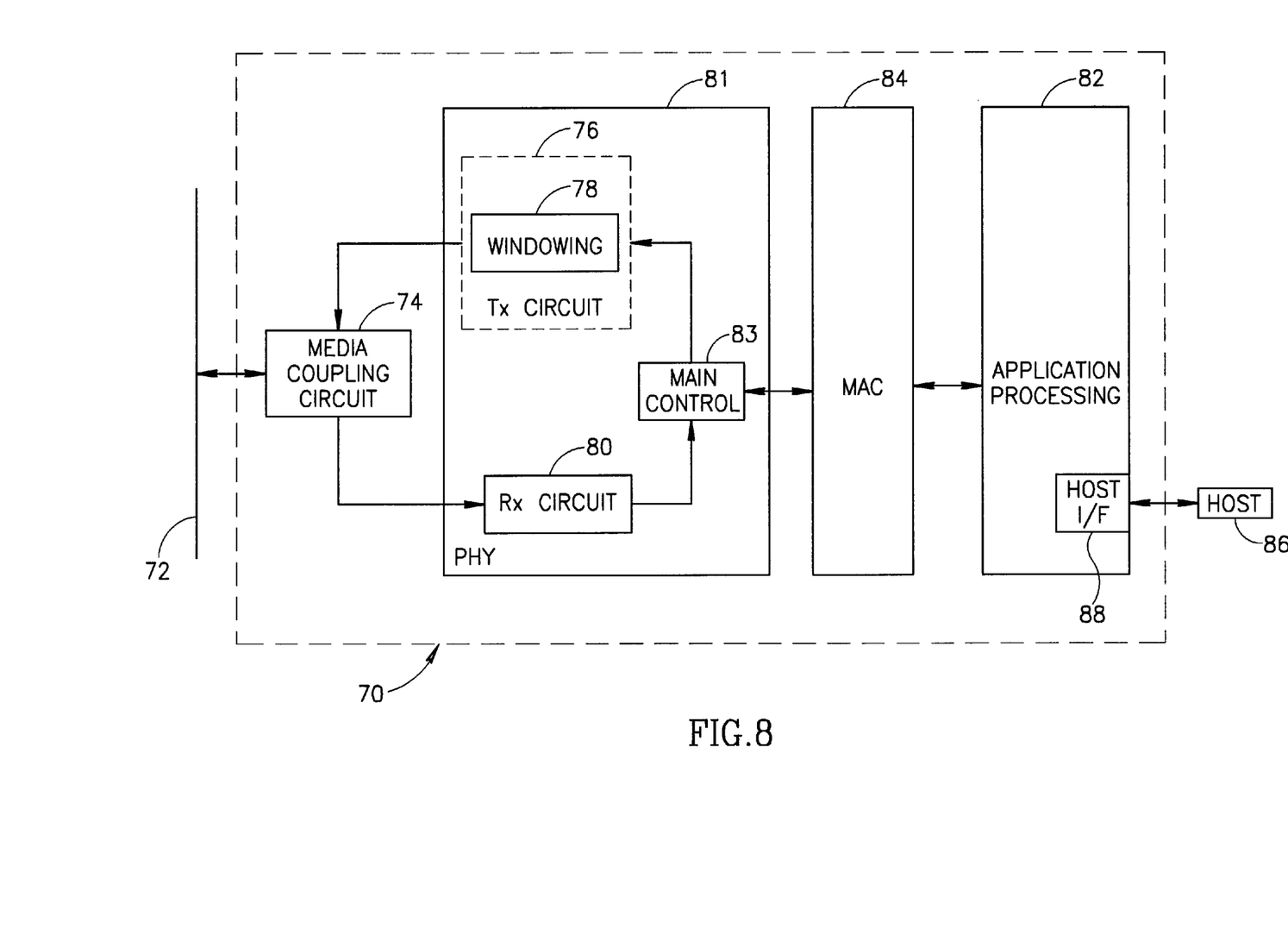
FIG. 8 is a block diagram illustrating an example embodiment of a station incorporating transmitter and receiver circuits adapted to perform the acquisition and synchronization mechanisms of the present invention.

A block diagram illustrating an example embodiment of a station incorporating transmitter and receiver circuits adapted to perform the windowing mechanism of the present invention is shown in FIG. 8. The station, generally referenced 70, represents a station that may operate on a stand alone basis or may be incorporated within a network device such as a switch, router, hub, broadband modem, cable modem, PLC based modem, etc. for performing communication functions (i.e. implementing OSI stack protocol functions including MAC functionality). The station comprises an application processor 82 with associated static, dynamic, volatile and/or non-volatile memory (not shown) in communication therewith. The application processor is also in communication, via a host interface 88, with a host device 86. The host may be adapted to communicate over one or more networks, e.g., LAN, WAN, etc.

The station comprises media coupling circuitry 74 for interfacing the station via the PHY circuit 81 to the shared media 72. The PHY circuit comprises a main control 83, transmit circuit 76 and receive circuit 80. The transmit circuit and receive circuit communicate over the media via the media coupling circuitry.

In the transmit direction, the main control functions to accept data from the MAC for transmission and to forward it to the transmit circuit. The transmit circuit receives data for transmission from the main control and functions to encode the data into symbols which are then modulated and transmitted over the media. The transmit circuit comprises windowing means 78 for implementing the windowing mechanism of the present invention as described in detail supra.

In the receive direction, the receive circuit in the PHY functions to demodulate, correlate and decode the received signal from the media coupling circuit and to generate received output data therefrom. The received output data is forwarded to the MAC via the main control.

The media access controller (MAC) 84 functions, on one side, to output transmit data to the transmit circuit and to input receive data from the receive circuit. On the processor side, it interfaces to the application processor. The MAC is adapted to implement any suitable layer 2 (i.e. data link layer) media access control technique well known in the art.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein.

Accordingly, it will be appreciated that all suitable variations, modifications and equivalents may be resorted to, falling within the spirit and scope of the present invention.

What is claimed is:

1. A method of windowing a sequence of symbols, said method comprising the steps of:
   extending each symbol earlier and later in time to generate a sequence of extended symbols;
   applying a windowing function to each extended symbol;
   overlapping and adding an extended left portion of a current symbol to an end portion of a previous symbol;
   overlapping and adding an extended right portion of said previous symbol to a start portion of said current symbol;
   overlapping and adding an extended left portion of a next symbol to an end portion of said current symbol; and
   overlapping and adding an extended right portion of said current symbol to an end portion of said next symbol.

2. The method according to claim 1, wherein the content of said symbol extensions fall within predetermined frequency spectrum limitations.

3. The method according to claim 1, wherein said step of extending each symbol comprises the step of circularly shifting said previous symbol to the left.

4. The method according to claim 1, wherein said step of extending each symbol comprises the step of circularly shifting said next transmit symbol to the right.

5. The method according to claim 1, wherein each said symbol comprises a chirp.

6. The method according in claim 1, wherein each said symbol comprises a pseudo noise (PN) waveform.

7. A method of windowing a sequence of transmit waveforms, each transmit waveform having a first end and a second end, said method comprising the steps of:
   continuing the second end of a previous transmit waveform later in time to generate a second continued portion;
   continuing the first end of a next transmit waveform earlier in time to generate a first continued portion, wherein said next transmit waveform is consecutively later in time from said previous transmit waveform;
   multiply said first continued portion, said second continued portion and a current transmit waveform by a windowing function to generate a weighted first continued portion, a weighted second continued portion and a weighted current transmit waveform, respectively; and
   summing said first weighted continued portion, said second weighted portion and said weighted current, transmit waveform to generate an augmented current transmit waveform.

8. Thy method according to claim 7, wherein said step of continuing said second end of said previous transmit waveform comprises the step of circularly shifting said previous transmit waveform to the left.

9. The method according to claim 7, wherein said step of continuing said first end of said next transmit waveform comprises the step of circularly shifting said next transmit waveform to the right.

10. The method according to claim 7, wherein said step of summing comprises summing said first weighted continued portion with a number of samples at the second end of said previous transmit waveform equivalent in time to the length of said first weighted continued portion.

11. The method according to claim 10, wherein said number of samples comprises approximately 3% of the length of said transmit waveform.

12. The method according to claim 10, wherein said number of samples comprises approximately 12% of the length of said transmit waveform.

13. The method according to claim 7, wherein said step of summing comprises summing said second weighted continued portion with a number of samples at the first end of said next transmit waveform equivalent in time to the length of said second weighted continual portion.

14. The method according to claim 13, wherein said number of samples comprises approximately 3% of the length of said transmit waveform.

15. The method according to claim 7, wherein the time duration of said first weighted continued portion is equal to the time duration of said second weighted continued portion.

16. The method according to claim 7, wherein said transmit waveform comprises a chirp.

17. The method according to claim 7, wherein said transmit waveform comprises a pseudo noise (PN) waveform.

18. The method according to claim 7, wherein said first windowing function comprises said second windowing function reversed in time.

19. The method according to claim 7, wherein said first windowing function and said second windowing function comprise linear functions.

20. The method according to claim 7, wherein said first windowing function and said second windowing function comprise non-linear functions.

21. The method according to claim 7, wherein said first windowing function and said second windowing function are derived from the function f(x)=ax−b sin x where a and b are constants.

22. The method according to claim 7, wherein said first windowing function and said second windowing function comprise the function W(t) given below $W(t)=r(t+\tau)$ if $-\tau<t<0$ 1 if $0<t<T-\tau$ $1-r(t-T+\tau)$ if $T-\tau<t<T$ 0 otherwise where $$r(t) = \frac{t}{\tau} - 0.0575\sin\left(\frac{2\pi t}{\tau}\right).$$

23. The method according to claim 7, wherein said method is implemented in an Application Specific Integrated Circuit (ASIC).

24. The method according to claim 7, wherein said method is implemented in a Field Programmable Gate Array (FPGA).

25. A method of windowing a sequence of transmit waveforms, each transmit waveform having a first end and a second end, said method comprising the steps of:
   extending the first end of a current waveform earlier in time by cyclically shifting right said transmit waveform to generate a first extended portion;
   extending the second end of said current waveform later in time by cyclically shifting left said transmit waveform to generate a second extended portion;
   extending the second end of a previous transmit waveform later in time by cyclically shifting left said previous transmit waveform to generate a third extended portion;

extending the first end of a next transmit waveform earlier in time by cyclically shifting right said next transmit waveform to generate a fourth extended portion;

multiplying said firm extended portion, said second extended portion, said third extended portion and said fourth extended portion by a windowing function so as to generate a first windowed portion, second windowed portion, third windowed portion and fourth windowed portion, respectively; and adding said first windowed portion to the second end of said previous transmit waveform, said second windowed portion to the first end of said next transmit waveform, said third windowed portion to the first end of said current transmit waveform and said fourth windowed portion the second end of said current transmit waveform.

26. The method according to claim 25, wherein said step of adding comprises adding said first windowed portion with a number of samples at the second end of said previous transmit waveform equivalent in time to the length of said first windowed portion.

27. The method according to claim 25, wherein said step of adding comprises adding said second windowed portion with a number of samples at the first end of said next transmit waveform equivalent in time to the length of said second windowed portion.

28. The method according to claim 25, wherein said step of adding comprises adding said third windowed portion with a number of samples at the first end of said current transmit waveform equivalent in time to the length of said third windowed portion.

29. The method according to claim 25, wherein said step of adding comprises adding said fourth windowed portion with a number of samples at the second end of said current transmit waveform equivalent in time to the length of said fourth windowed portion.

30. The method according to claim 25, wherein the time durations of said first windowed portion, second windowed portion, third windowed portion and fourth windowed portion are equal.

31. The method according to claim 30, wherein each time duration comprises approximately 3% of the length of said transmit waveform.

32. The method according to claim 25, wherein said number of samples comprises approximately 12% of the length of said transmit waveform.

33. The method according to claim 25, wherein said transmit waveform comprises a chirp.

34. The method according to claim 25, wherein said transmit waveform comprises a pseudo noise (PN) waveform.

35. The method according to claim 25, wherein said windowing function is a linear function.

36. The method according to claim 25, wherein said windowing function is a non-linear function.

37. The method according to claim 25, wherein said window function is derived from the function f(x)=ax−b sin x, wherein a and b are constants.

38. The method according to claim 25, wherein said windowing function comprises the function W(t) given below $W(t)=r(t+\tau)$ if $-\tau<t<0$ 1 if $0<t<T-\tau$ $1-r(t-T+\tau)$ if $T-\tau<t<T$ 0 otherwise where $$r(t) = \frac{t}{\tau} - 0.0575\sin\left(\frac{2\pi t}{\tau}\right).$$

39. The method according to claim 25, wherein said method is implemented in an Application Specific Integrated Circuit (ASIC).

40. The method according to claim 25, wherein said method is implemented in a Field Programmable Gate Array (FPGA).

41. A method of windowing a sequence of transmit waveforms, said method comprising the steps of:

extending each transmit waveform both earlier and later in time;

applying a windowing function to both extended portions of each transmit waveform; and overlapping and summing the extended portions of a current transmit waveform with the previous transmit waveform and next waveform.

42. An Application Specific Integrated Circuit (ASIC) for use in a communications node for windowing a transmit waveform sequence, each transmit waveform having a first end and second end later in time from said first end, comprising:

means for generating a second continued portion by cyclically continuing later in time the second end of a previous transmit waveform;

means for generating a first continued portion by cyclically continuing earlier in time the first end of a next transmit waveform;

means for multiplying said first continued portion by the amplitude of a first windowing function to generate a weighted first continued portion and multiplying said second continued portion by the amplitude of a second windowing function to generate a weighted second continued portion; and means for summing said first weighted continued portion with the second end of said previous transmit waveform and said second weighted continued portion with the first end of said next transmit waveform.

43. The ASIC according to claim 42, wherein said method is implemented in an Application Specific Integrated Circuit (ASIC).

44. The ASIC according to claim 42, wherein said transmit waveform comprises a chirp.

45. The ASIC according to claim 42, wherein said transmit waveform comprises a pseudo noise (PN) waveform.

46. The ASIC according to claim 42, wherein said windowing function is a linear function.

47. The ASIC according to claim 42, wherein said windowing function is a non-linear function.

48. The ASIC according to claim 42, wherein said window function is derived from the function f(x)=ax−b sin x, wherein a and b are constants.

49. The ASIC according to claim 42, wherein said first windowing function and said second windowing function comprise the function W(t) given below $W(t)=r(t+\tau)$ if $-\tau<t<0$ 1 if $0<t<T-\tau$ $1-r(t-T+\tau)$ if $T-\tau<t<T$ 0 otherwise where $$r(t) = \frac{t}{\tau} - 0.0575\sin\left(\frac{2\pi t}{\tau}\right).$$

50. A transmitter for use in a communications system, comprising:
an initial index calculator operative to generate an initial index in accordance with a shift index input from a host data source;
a transmit waveform generator adapted to generate a sequence of transmit waveforms, each transmit waveform rotated by an amount in accordance with said initial index and having a length equal to the length of a modulation waveform signal;
a windowing circuit adapted to receive said transmit waveform and to apply a windowing function thereto, said windowing circuit comprising:
means for generating a second continued portion by cyclically continuing later in time the second end of a previous transmit waveform;
means for generating a first continued portion by cyclically continuing earlier in time the first end of a next transmit waveform;
means for multiplying said first continued portion by the amplitude of a first windowing function to generate a weighted first continued portion and multiplying said continued portion by the amplitude of a second windowing function to generate a weighted second continued portion;
means for summing said first weighted continued portion with the second end of said previous transmit waveform and said second weighted continued portion with the first end of said next transmit waveform so as to generate a windowed transmit waveform;
channel coupling circuitry operative to filter, amplify and couple said windowed waveform onto a channel media.

51. A communications station for transmitting and receiving signals to and from other stations connected over a shared communications media based network, comprising:
a coupling circuit for generating a receive signal received over said network and for outputting a transmit signal onto said network;
a transmitter adapted to modulate data to be transmitted in accordance with a modulation scheme so as to generate a transmit waveform therefrom, said transmitter comprising a windowing circuit for applying a windowing function to said transmit waveform, said windowing circuit comprising:
means for generating a second continued portion by cyclically continuing later in time the second end of a previous transmit waveform;
means for generating a first continued portion by cyclically continuing earlier in time the first end of a next transmit waveform;
means for multiplying said first continued portion by the amplitude of a first windowing function to generate a weighted first continued portion and multiplying said second continued portion by the amplitude of a second windowing function to generate a weighted second continued portion;
means for summing said first weighted continued portion with the second end of said previous transmit waveform and said second weighted continued portion with the first end of said next transmit waveform so as to generate a windowed transmit waveform;
a receiver adapted to demodulate said receive signal in accordance with said modulation scheme so as to generate a receive data signal therefrom;
a media access control (MAC) circuit adapted to interface an application processor to said shared communications media;
said application processor adapted to control the operation of said transmitter, receiver and MAC and to provide an interface between said MAC and an external host.

52. The communications station according to claim 51, wherein said modulation scheme comprises code shift keying (CSK) modulation.

53. A computer program product for use in communications station said computer program product comprising:
a computer usable medium having computer readable program code means embodied in said medium fur applying a windowing function to a transmit waveform in a communications node, said computer program product comprising:
computer readable program code means for generating a second continued portion by cyclically continuing later in time the second end of a previous transmit waveform;
computer readable program code means for generating a first continued portion by cyclically continuing earlier in time the first end of a next transmit waveform;
computer readable program code means for multiplying said first continued portion by the amplitude of a first windowing function to generate a weighted first continued portion and multiplying said second continued portion by the amplitude of a second windowing function to generate a weighted second continued portion; and
computer readable program code means for multiplying said first weighted continued portion with the second end of said previous transmit waveform and said second weighted continued portion wit the first end of said next transmit waveform.

* * * * *